United States Patent
Nair

(10) Patent No.: US 12,004,676 B1
(45) Date of Patent: Jun. 11, 2024

(54) LIGHT-BLOCKING ELEMENTS WITH COLOR-MASKING COMPOSITIONS

(71) Applicant: Eastman Kodak Company, Rochester, NY (US)

(72) Inventor: Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 18/359,197

(22) Filed: Jul. 26, 2023

(51) Int. Cl.
*A47H 23/10* (2006.01)
*C09D 5/03* (2006.01)
*C08J 9/35* (2006.01)

(52) U.S. Cl.
CPC ............ *A47H 23/10* (2013.01); *C09D 5/03* (2013.01); *C08J 9/35* (2013.01); *C08J 2333/08* (2013.01); *C08J 2401/12* (2013.01)

(58) Field of Classification Search
CPC .... A47H 23/10; C09D 5/03; C08J 9/35; C08J 2333/08; C08J 2401/12
USPC ........................................ 428/32.5
See application file for complete search history.

(56) References Cited

U.S. PATENT DOCUMENTS

| | | |
|---|---|---|
| 1,948,568 A | 2/1934 | Faber et al. |
| 2,971,458 A | 2/1961 | Kumins et al. |
| 3,030,232 A | 4/1962 | Morgenstern |
| 3,042,573 A | 7/1962 | Roberts |
| 3,084,661 A | 4/1963 | Roberts |
| 3,713,868 A | 1/1973 | Gordon et al. |
| 3,954,404 A | 5/1976 | Childers et al. |
| 3,990,840 A | 11/1976 | von der Eltz et al. |
| 4,118,526 A | 10/1978 | Gregorian et al. |
| 4,208,173 A | 6/1980 | Gregorian et al. |
| 4,439,473 A | 3/1984 | Lippman |
| 4,472,165 A | 9/1984 | Gregorian et al. |
| 4,510,201 A | 4/1985 | Takeuchi et al. |
| 4,836,871 A | 6/1989 | Kato |
| 5,849,364 A | 12/1998 | Nachtman et al. |
| 7,153,626 B2 | 12/2006 | Foster et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 9,469,738 B1 | 10/2016 | Nair et al. |
| 9,963,569 B2 | 5/2018 | Nair et al. |
| 11,079,519 B2 | 8/2021 | Lofftus et al. |
| 11,326,038 B2 | 5/2022 | Kamel et al. |
| 2018/0223474 A1 | 8/2018 | Nair et al. |
| 2019/0263988 A1* | 8/2019 | Nair .................. C09D 7/69 |
| 2019/0390027 A1 | 12/2019 | Nair et al. |
| 2019/0390028 A1 | 12/2019 | Lobo et al. |
| 2019/0390029 A1 | 12/2019 | Nair et al. |
| 2020/0172690 A1* | 6/2020 | Nair .................. C08J 9/32 |
| 2021/0189641 A1 | 6/2021 | Nair et al. |
| 2021/0190289 A1 | 6/2021 | Nair |
| 2022/0040946 A1 | 2/2022 | Schaefer |

* cited by examiner

*Primary Examiner* — Betelhem Shewareged
(74) *Attorney, Agent, or Firm* — J. Lanny Tucker

(57) ABSTRACT

A prepared for print (PFP) light-blocking element has a scoured fabric with face side and back side, and a dried and non-foamed color-masking composition on the back side at a coverage of 5-75 g/m². This dried and non-foamed color-masking composition contains a tinting component and a film-forming polymeric binder having a $T_g$ of less than 25° C. The light-blocking element further has a cured, crushed, and dried foamed opacifying layer disposed on the dried and non-foamed color-masking composition. The dried and non-foamed color-masking composition effectively reduces visual perception on the uncoated face side as measured by a ΔE value as determined from ΔL*, Δa*, and Δb* CEILAB color values, to be <2, compared to visual perception on the uncoated face side of the same treated fabric when the cured, crushed, and dried foamed opacifying layer is absent.

14 Claims, No Drawings

LIGHT-BLOCKING ELEMENTS WITH COLOR-MASKING COMPOSITIONS

CROSS-REFERENCE TO RELATED APPLICATIONS

Reference is made to the following co-pending and commonly assigned U.S. Ser. No. 18/359,172 filed on Jul. 7, 2023 by Nair and Brick, entitled "Methods of Providing Treated Fabrics and Light-Blocking Elements", the disclosure of which is incorporated herein by reference.

FIELD OF THE INVENTION

This invention relates to prepared for print (PFP) light-blocking elements prepared from prepared for print (PFP) treated fabrics that comprise a non-foamed color-masking composition disposed on the back side of a scoured fabric substrate. Such PFP light-blocking elements have a foamed opacifying layer disposed on the non-foamed color-masking layer that modifies or masks the color of the foamed opacifying layer when viewed from the face side of the scoured fabric. These PFP light-blocking elements can be printed with useful images or designs and used as shades, curtains, and other window treatments that can block excessive ambient light impinging on the back side while providing an aesthetically pleasing viewable face side.

BACKGROUND OF THE INVENTION

Draperies are primarily designed for style and appearance and are generally made from fabrics of various colors that are printed or, in some other way, are made to carry a design or image on an outer surface. Digital printing is replacing traditional methods in the textile industry for providing such designs or images. The main incentives for such changes are cost-efficiency, ability to personalize prints, and flexibility from digital imaging. Traditional screen-printing is being replaced by digital textile printing solutions like thermal transfer or sublimation printing for shorter production runs and personalized prints that require multiple colors and detailed images. Thermal transfer or heat transfer printing is a method used to impart a desired color or color pattern or image to synthetic fabrics such as those prepared from polyester, nylon, and acrylic fibers.

Thermal transfer printing uses thermally responsive inks containing sublimable colorants that under the influence of heat sublime or vaporize onto the surface of the fabric, penetrate the fibers, and are entrained therein or attached to the textile fibers. Heat transfer printing processes and materials are quite old and described in numerous patent publications including for example, in U.S. Pat. No. 7,153,626 (Foster et al.) "Blackout" or light-blocking materials typically refer to coated layers in articles that are substantially impermeable to light such as visible electromagnetic radiation. Thus, when a blackout article such as a blackout curtain or shade is hung over a window, it generally blocks substantially all external light from entering the room through that window. Blackout materials are suitable as curtains and shades for domestic use, for institutional use in hospitals and nursing homes, as well as for use in commercial establishments such as hotels, movie theaters, and aircraft windows where the option of excluding light can be desirable.

Light-blocking articles such as the blackout curtains or shades can be comprised of a porous fabric substrate coated with more than one layer of a foamed composition. One method that is practiced in the art for making blackout materials is to sandwich a light-absorbing, foamed black or grey pigment-containing layer, such as a carbon black layer between two foamed light scattering, white pigment-containing layers. However, when a radiation-blocking coating has, as it often does, a strongly light absorbing material containing black pigments such as carbon black, between two such reflective layers, it has at least two distinct problems. First, such materials require three or more separate coating operations that reduce manufacturing productivity, increase energy, and water usage, and have a higher carbon footprint. Secondly, carbon black in the light absorbing middle layer can become "fugitive" (or non-enclosed) from a puncture or tear occurring during sewing or laundering of the fabric, and soil other layers such as reflective layers, which is highly objectionable, not to mention the potential carcinogenicity of free carbon black. Additionally, the stitches generated in such light-blocking articles during sewing (manufacturing) can cause fugitive carbon to spread over a larger area thereby increasing the area of objectionable shading of the light-colored surface. Further, such articles provide only one level of light-blocking when the fabric substrate is coated. Varying degrees of light-blocking (tunability) cannot be designed into these materials.

To address the noted problems, considerable innovation in this field of light-blocking elements for example, as window treatments, is described in the teachings of U.S. Pat. No. 7,754,409 (Nair et al.), U.S. Pat. No. 7,887,984 (Nair et al.), U.S. Pat. No. 8,252,414 (Putnam et al.), U.S. Pat. No. 8,329,783 (Nair et al.), U.S. Pat. No. 9,469,738 (Nair et al.), and U.S. Pat. No. 9,963,569 (Nair et al.), and of U.S. Patent Application Publications 2018/0223474 (Nair et al), 2021/0189641 (Nair et al.), and 2021/0190289 (Nair), wherein porous polymer particles having discrete pores and made by a multiple emulsion process, are combined with other materials including opacifying colorants to provide foamed opacifying layers in light-blocking elements or other decorative articles.

Other light-blocking elements are described in U.S. Patent Application Publications 2019/0390027 (Nair et al.), 2019/0390028 (Lobo et al.), and 2019/0390029 (Nair et al.), which light-blocking elements have a functional layer disposed over a foamed opacifying layer that is coated on one side of a fabric. The functional layer compositions incorporated into these light-blocking elements can contain various spacer particles such as glass beads to achieve various properties.

"Prepared for print" (or "PFP") blackout coated fabrics are gaining popularity because they are less expensive to fabricate than decoratively woven fabrics, and they can be custom printed on demand. Most often, they are lightweight fabrics designed to keep the cost down. However, it is essential that the uncoated fabrics be scoured to remove oils and softeners and heat set for dimensional stability prior to applying a blackout or light-blocking coating on the back side and printing a design or image on the face side. Further, depending upon the color of the face of the fabric, the color of the blackout coating showing through onto the face side becomes objectionable especially when an image or design is applied on the face side and the resultant print is compromised in the unprinted areas from the blackout coating.

The perceived color of an object depends on that material's characteristic absorption and reflectance of different frequencies of electromagnetic radiation in the visible region of the spectrum. For example, if a material's surface is completely reflective in the visible region, that material will appear as white. The perceived color of an article will depend on what color is reflected while all other frequencies of the visible spectrum are absorbed.

For PFP blackout coated fabrics, it is important that there be only a minimum difference between the face side, with and without blackout coating, on the back side in terms of hue, chromaticity, and luminosity and that it be barely noticed, as measured by low ΔE values as described herein below.

Related U.S. Pat. No. 4,118,526 (Gregorian et al.) and U.S. Pat. No. 4,208,173 (Gregorian et al.) describe foamable compositions for treating fabrics, which foamable compositions can include a finishing agent(s) that has various purposes depending upon the use of the resulting treated fabrics. When carried out at textile finishing facilities where scouring and other essential treatments are done for PFP polyester fabrics, foam coating for fabric finishing adds an extra complexity. First, a foaming unit is needed to create a foam, which is then gap coated onto the fabric. As these patents describe, the coated fabric has then to be compressed, padded or vacuumed to assure complete penetration of the foam throughout the fabric, followed by drying and curing.

It is the objective of the present invention to address these manufacturing problems and disadvantages as well as to provide an advance in the art related to the manufacture and use of PFP light-blocking elements.

SUMMARY OF THE INVENTION

This invention provides a prepared for print (PFP) light-blocking element, comprising:

a scoured fabric having a face side and a back side, and having on the coated back side, a dried and non-foamed color-masking composition at a coverage of at least 5 g/m² and up to and including 75 g/m², the dried and non-foamed color-masking composition comprising one or more tinting components and a film-forming polymeric binder having a $T_g$ of less than 25° C., forming a treated fabric with an uncoated front side and a coated back side, and the light-blocking element further comprising a cured, crushed, and dried foamed opacifying layer disposed on the dried and non-foamed color-masking composition, to form a prepared for print (PFP) light-blocking element, wherein:

the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value as determined from ΔL*, Δa*, and Δb* CEILAB color values, to be <2, compared to visual perception on the uncoated face side of the same treated fabric when the cured, crushed, and dried foamed opacifying layer has been omitted, a light-blocking element like that prepared for print (PFP) light-blocking element, but from which the dried and non-foamed color-masking layer has been omitted, exhibits a ΔE value as determined from ΔL*, Δa*, and Δb* CEILAB color values, to be >2 when viewed from the face side of the scoured fabric, compared to the prepared for print (PFP) light-blocking element comprising the dried and non-foamed color-masking layer, and the cured, crushed, and dried foamed opacifying layer comprises:

(a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b') a binder matrix that is present in an amount of at least 10 weight % and up to and including 80 weight %;

(c) two or more additives that are present in a total amount of at least 0.0001 weight % and up to and including 40 weight %, the two or more additives comprising at least one foaming surfactant and at least one compound that is a foam stabilizer;

(d) less than 5 weight % of an aqueous medium; and (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm, all amounts of the (a) porous particles, (b') binder material, (c) two or more additives, (d) aqueous medium, and (e) opacifying colorant being based on the total weight of the cured, crushed, and dried foamed opacifying layer.

The present invention solves the problems noted above by providing a non-foamed color-masking composition (or layer) on the back side of scoured fabrics, which non-foamed color-masking composition can be designed to specifically "mask" the color of the foamed blackout (opacifying) coating coated over it on the back side from showing through on the face side of the scoured fabric. The color of the non-foamed color-masking layer can be adjusted by those who practice the present invention to match the coloration of the face side of the scoured fabrics so that the ΔE (as defined below) is less than 2 as defined using CIELAB color parameters.

In achieving these advantages, the non-foamed color masking composition can be applied to the back side of the scoured fabric in a textile scouring plant using gap or spray coating techniques such that a foamed opacifying coating can be provided at a later time but prior to printing an image or design on the face side while color distortion viewed from the face side is minimized.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the foamed aqueous opacifying compositions, foamable aqueous compositions, non-foamed functional compositions, non-foamed color-masking compositions, and various component materials used in the practice of the present invention, unless otherwise indicated, the singular forms "a," "an," and "the" are intended to include one or more of the components (that is, they are to include plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, "foamed" compositions can be comprised of the same or different chemical materials as "non-foamed" compositions, but a critical different between such types of compositions is that one is foamed to an appreciable extent and the other is not. Non-foamed aqueous compositions have a foam density of greater than or equal to 0.8 g/cm$^3$ or of greater than or equal to 0.9 g/cm$^3$, whereas foamed aqueous compositions generally have a foam density of less than 0.8 g/cm$^3$ or of even less than 0.5 g/cm$^3$.

The terms (a) "porous particle" and (a) "porous particles" are used herein, unless otherwise indicated, to refer to porous organic polymeric materials useful in the foamable aqueous compositions, foamed aqueous opacifying compositions, and foamed opacifying layers (or compositions). Each (a) porous particle generally comprises a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the (a) porous particles generally has the same composition throughout that generally solid phase. That is, the continuous polymeric phase is generally uniform in composition including any materials [for example, a (e) opacifying colorant] that can be incorporated therein. In addition, if mixtures of organic polymers are used in the continuous polymeric phase, generally those mixtures also are dispersed uniformly throughout.

As used herein, the term "isolated from each other" refers to the different (discrete) pores of same or different sizes that are separated from each other by some material of the continuous polymeric phase, and such pores are not interconnected. Thus, "discrete" pores refer to "individual" or "closed," non-connected pores or voids distributed within the continuous polymeric phase.

The (a) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the (a) porous particles can include discrete pores of all sizes and shapes (that is, discrete pores entirely within the continuous polymeric phase) providing a suitable volume in each discrete pore, macro discrete pores are particularly useful. While there can be open macro pores on the surface of the porous particle, such open pores are not desirable and are present only by accident. The size of the (a) porous particles, their formulation, and manufacturing conditions are the primary controlling factors for discrete pore size. However, typically the discrete pores independently have an average size of at least 100 nm and up to and including 7,000 nm. Whatever the size of the discrete pores, they are generally distributed randomly throughout the continuous polymeric phase. Average pore size can be determined by SEM (Scanning Electron Microscopy) evaluations of particle cross-sections.

The (a) porous particles used in the present invention generally have a porosity of at least 20 volume % or of at least 35 volume % or even of at least 40 volume % and up to and including 60 volume % or up to and including 70 volume %, all based on the total porous particle volume. Porosity can be measured by an obvious modification of the known mercury intrusion procedure where mercury is used to crush the closed pores at high pressure and the volume of the irreversibly crushed pores is used to measure porosity (or pore volume), for example see the publication by Nair et al., "Colloids and Surfaces A:Physcioehcm. Eng. Aspects" 443 (2014) 583-595.

Glass transition temperatures of organic polymers used in the practice of the present invention, can be measured using Differential Scanning Calorimetry (DSC) using known procedures. For many commercially available organic materials, the glass transition temperatures are often known from the suppliers.

Color measurements using the CIELAB L*, a*, and b* values (CIELAB color system) described herein is a standard way of measuring color where the system quantifies visual changes that are calibrated to visual changes perceived by a standard observer. The CIELAB color system, using illumination with a D65 standard light and the 100 Standard Observer function, is utilized by making spectroscopic measurements of the differences in reflectance between sample color systems and the same sample color systems that had been challenged with a coating deposited on it. The CIELAB color system correlates to the sensitivity of the eye towards brightness or luminance and to color changes.

The CIELAB L* value reflects the eye's sensitivity to brightness as one observes colors ranging from dark colors to bright color and from gray to white. L* is defined as 0 for a surface that is black and non-reflecting, and is defined as 100 for a surface that is white. The CIELAB a* value represents the ratio of the reflectance in the green region to the reflectance in the red region of the electromagnetic spectrum. The CIELAB b* value represents the ratio of the reflectance in the blue region to the yellow region of the electromagnetic spectrum. The CIELAB L*, a*, and b* values can be calculated from measured reflectance spectra.

Delta E (or $\Delta E$) is a measurement of how much a perceived color can differ from its original color. The "E" in $\Delta E$ stands for "Empfindung," which is the German word for sensation or perception. "Delta" is a Greek word that stands for the incremental change of a variable. Thus, as used herein, the term $\Delta E$ refers to a difference in sensation. A lower $\Delta E$ means better color match. When comparing the color and luminosity contrast between two different adjacent surfaces, it is useful to instrumentally calculate the function E of each surface from its CIELAB L*, a*, and b* values, where $E^2 = L^{*2} + a^{*2} + b^{*2}$. The difference between the two E values ($\Delta E$) for the two adjacent surfaces can be used as a quantitative measure of the color differences (contrast) between these two surfaces. A lower $\Delta E$ means that there has been less color shift. A higher $\Delta E$ means that there has been a more significant color shift. A ΔE of 1 may be perceptible by some observers upon close inspection and a ΔE of 5 may be easily noticeable to most observers upon inspection.

These ΔE values are instrumentally determined by measuring or observing the E values from the face side of scoured fabric under the circumstances described below.

ΔE values can be determined and used to define the invention in each of two different contexts:

In the first context, the ΔE values can be determined by comparing: the L*, a*, and b* CIELAB values of a prepared for print light-blocking element according to the present invention having a color-masking composition (as described below) and a cured, crushed, and dried foamed opacifying layer (as described below) disposed on the back side of the scoured fabric, with the respective CIELAB L*, a*, and b* values of a similar prepared for print light-blocking element from which the non-foamed color-masking composition has been omitted. The compared respective CIELAB L*, a* and b* values provide differences, that is, ΔL*, Δa*, and Δb* values. The ΔE values can then be a combination of one or more of the ΔL*, Δa*, and Δb* values. In this context, the ΔE is desired to be <2, or ≤1.5, or even <1.0. Thus, it is desired that this ΔE value be as close to zero as possible.

In a second context, a prepared for print (PFP) light-blocking element like those prepared according to the present invention, but from which the dried and non-foamed color-masking layer has been omitted, can exhibit a ΔE value that is determined from CIELAB ΔL*, Δa*, and Δb* CEILAB, of >2 or even >3, when viewed from the face side of the scoured fabric, compared to the prepared for print (PFP) light-blocking element according to the present invention and comprising the dried and non-foamed color-masking layer underneath the cured, crushed, and dried foamed opacifying layer.

Opacity in the PFP light-blocking elements according to this invention can be evaluated in transmitted light that passes through outside the finished article, by measuring its optical density (OD) using an apparatus consisting of a fiber optic Xenon light source, a computer controlled translational stage, and an optical photometer. The fiber optic can be positioned 10 mm above the surface of the scoured fabric face side of the light-blocking element. An optical photometer is then placed on the back side of the PFP light-blocking element (thus, behind the cured, crushed and dried foamed opacifying layer) directly under the fiber optic in order to quantify the amount of light that passes through the entire light-blocking element. The optical density is then calculated by comparing the light that passes through the PFP light-blocking element to the light that reaches the optical photometer when no cured, crushed, and dried foamed opacifying layer is present.

Unless otherwise indicated herein, the terms "face side" and "back side" in reference to the scoured fabric described below refers to opposing sides thereof. The face side, also known in the art as the "right side" of the scoured fabric is the side that is usually visible to a viewer that may for example, be inside a room. The back side, also known in the art as the "wrong side" of the scoured fabric is generally that side that is not readily viewed, and in the present invention is the side on which the non-foamed color-masking composition (and cured, crushed, and dried foamed opacifying layer) is disposed. The treated fabrics of the present invention have an uncoated face side that is the viewable side and a coated back side having the dried, non-foamed color-masking layer thereon.

As used herein for the methods according to the present invention, unless otherwise indicated, the terms "step" and "operation" are considered synonymous, and the term "steps" and "operations" are also considered synonymous.

Uses

The methods of the present invention firstly provide treated fabrics that can be used in future finishing operations to prepare PFP fabrics, and can be rolled up for future operations, and thus can be precursor elements for providing PFP light-blocking elements or other articles of interest in which treated fabrics having face sides that are useful for a printing. Ultimately, the present invention provides PFP light-blocking elements or window treatments for various utilities in which the coloration of the back side disposed cured, crushed, and dried foamed opacifying layer is masked or modified when the light-blocking element is viewed from the face side of the scoured fabric.

Foamable Aqueous Opacifying Compositions

The foamable aqueous opacifying compositions described herein can be suitably aerated (or "foamed") to provide foamed aqueous opacifying compositions, for example to prepare a cured, crushed, and dried foamed opacifying composition (or layer) in the ultimate PFP light-blocking elements according to the present invention as described below. In many embodiments, each foamable aqueous compositions used in the present invention has five essential components, that is, only five components are needed to obtain the properties of the cured, crushed, and dried foamed opacifying layer described herein: (a) porous particles as described below; (b) a binder material [that is converted into a (b') binder matrix], also as described below; (c) two or more additives as described below, for example comprising at least one foaming surfactant and at least one compound that is a foam stabilizer; (d) an aqueous medium (described below); and (e) an opacifying colorant that is a different material from all of the (a) porous particles, (b) binder material, and (c) two or more additives, also as described below. This opacifying colorant is chosen to absorb electromagnetic radiation generally in the UV and visible regions of the electromagnetic spectrum, for example, at wavelengths of at least 250 nm and up to and including 800 nm or wavelengths of at least 350 nm and up to and including 700 nm.

The foamable aqueous opacifying composition generally has a % solids of at least 35% or of at least 40%, and up to and including 60% or up to and including 70%.

(a) Porous Particles:

Porous particles used in the present invention containing discrete pores (or compartments or voids) are used in the cured, crushed, and dried foamed opacifying layers and they are generally prepared using one or more water-in-oil emulsions in combination with an aqueous suspension process, such as in the Evaporative Limited Coalescence (ELC) process that is known in the art. The details for the preparation of the (a) porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), U.S. Pat. No. 8,252,414 (Putnam et al.), U.S. Pat. No. 10,920,032 (Nair et al.), and U.S. Pat. No. 11,275,203 (Nair et al.), the disclosures of all of which are incorporated herein by reference. Thus, the (a) porous particles are generally polymeric and organic in nature (that is, the continuous polymeric phase is polymeric and organic in nature) and non-porous particles (having less than 5% porosity) are excluded from use in the present invention.

In general, the (a) porous particles used in the present invention have a mode particle size equal of at least 2 μm or of at least 3 μm, and up to and including 20 μm, or up to and including 30 µm or even up to and including 50 µm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical.

The (a) porous particles are generally present in the foamable aqueous composition in an amount of at least 0.05 weight % or of at least 0.5 weight %, and up to and including 15 weight % or up to and including 20 weight %, based on the total weight of the foamable aqueous opacifying composition (including all solvents that are present).

Optimal cured, crushed, and dried foamed opacifying layers according to the present invention comprise: (a) porous particles containing a small amount of an (e) opacifying colorant as described below to enhance the light blocking capacity of the (a) porous particles (particularly transmitted light blocking capacity); a (b') matrix material derived from a (b) binder material to hold the (a) porous particles in place; and the (c) two or more additives including optionally one or more tinting colorants that can be in other (a) porous particles or dispersed within the cured, crushed, and dried foamed opacifying layer.

A single cured, crushed, and dried foamed opacifying layer is present in the PFP light-blocking elements according to the present invention as opposed to multiple foamed white layers sandwiching a foamed black opacifying layer that are used in multi-layer packages in prior art light-blocking elements. Multiple light scattering effects by and among the (a) porous particles and the surrounding dry foam cells, increase the path of the electromagnetic radiation. This single cured, crushed, and dried foamed opacifying layer provides all of the desired light-blocking functional advantages so that the use of multiple foamed opacifying or other foamed layers and their attendant problems can be avoided.

(b) Binder Materials:

The foamable aqueous opacifying compositions used in the present invention also comprises one or more (b) binder materials from which a binding (b') matrix material can be derived to hold the (a) porous particles, the (c) two or more additives, and the (e) opacifying colorants together in a cured, crushed, and dried foamed opacifying layer.

The (b) binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

A useful class of film-forming (b) binder materials includes aqueous latex polymer dispersions such as acrylic latexes (including acrylic copolymers) that can be ionic or nonionic colloidal dispersions of acrylate polymers and copolymers. Useful (b) binder materials are commercially available and are described in the publications cited above in the section for the (a) Porous Particles The (b) binder material generally has a glass transition temperature that is less than 25° C., more likely equal to or less than −10° C., or even equal to or less than −25° C. Glass transition temperature for these materials can be determined using known procedures such as Differential Scanning Calorimetry as described above.

The one or more (b) binder materials can be present in the foamable aqueous opacifying composition in an amount of at least 15 weight % or of at least 30 weight %, and up to and including 50 weight % or up to and including 70 weight %, based on the total foamable aqueous opacifying composition (that is, the total weight of all components including all solvents).

(c) Additives:

The foamable aqueous opacifying compositions can include at least 0.0001, or at least 0.01 weight %, and up to and including 2 weight %, or up to and including 20 weight %, or even up to and including 30 weight % of (c) two or more additives comprising at least one foaming agent (or foaming surfactant) and at least one foam stabilizing agent as defined below. These amounts refer to the total of all of the (c) two or more additives in each foamable aqueous composition and are based on the total weight of those compositions (including all solvents).

Any of these additives, unless otherwise noted, can be obtained from various commercial sources. They can be present within any location of the foamed aqueous opacifying composition, including but not limited to the continuous polymeric phase; within discrete pores; or both within discrete pores and the continuous polymeric phase of the (a) porous particles.

Useful (c) two or more additives include but are not limited to plasticizers, inorganic or organic pigments and dyes (for example, pigment or dye colorants different from the opacifying colorants described below), flame retardants, biocides (including fungicides and antimicrobial agents), pH buffers, optical brighteners, tinting colorants, thickeners, and various surfactants, and inert inorganic or organic fillers (such as clays).

At least one of the (c) two or more additives is one or more foaming surfactants each of which that functions to create and enhance foam formation. In addition, the (c) two or more additives comprise one or more foam stabilizers (or foam stabilizing agents) that are also surface-active agents that function to structure and stabilize the foam.

Representative examples of useful foaming surfactants include but are not limited to, the following compounds: alkyl betaines, amine oxides (amphoteric), lauryl sulfate salts, cetyl sulfate salts, sulfosuccinate ester salts, ammonium sulfosuccinate, disodium stearyl sulfosuccinate, diammonium n-octadecyl sulfosuccinamate, sulfosuccinamides, ethoxylated alcohols, ionic, nonionic or anionic agents such as fatty acid soaps or a fatty acid condensation product with an alkylene oxide (for example, the condensation product of ethylene oxide with lauryl or oleic acid or an ester of fatty alcohols), the ammonium salt of a C12 to C15 alkanol sulfate containing ethyleneoxide, ammonium ethoxy sulfate, ammonium polyethyleneoxy sulfate, alkyl phenols with 8 to 12 carbons in the alcohol group and 12 to 20 ethyleneoxy units, ammonium decylphenoxy poly(ethyleneoxy) sulfate, C11 to C15 linear secondary alcohols with 12 to 20 ethyleneoxy units, ethylene oxide adducts of linear primary alcohols with 10 to 16 carbons in the alcohol moiety, ammonium salt of a C11 to C15 secondary alkanol sulfate containing ethyleneoxide, calcium 2,4-didodecylphenoxy-poly(ethyleneoxy) sulfate, sodium salt of 2-ethyl-2-methyl-4-undecanol sulfate, ammonium dinonylphenoxy-poly(ethyleneoxy) sulfate, sodium salt of 2-ethyl-hexanol sulfate, ethylamine salt of pentadecyl-poly(ethyleneoxy)sulfate, butyl-amine salt of dodecyl-polyoxyethylene sulfate, ethoxyamine salt of octyl-polyoxyethylene sulfate, hexylamine salt of nonylphenoxy-polyethyleneoxysulfate, the corresponding alkali metal, ammonium and amine salts, fatty acid alkanolamides, tertiary alkylamines quaternized with benzene sulfonic acid, amphoteric glycine derivatives, and similar materials.

Useful foam stabilizers include but are not limited to: ammonium stearate, potassium stearate, ammonium oleate, and ammonium ricinoleate.

Useful examples of the above-mentioned (c) additives can be obtained from various commercial sources.

It can also be useful to include thickeners as some of the (c) two or more additives to modify the viscosity of the foamable aqueous opacifying composition and to stabilize it so aeration is not inhibited.

Useful (c) two or more additives can also comprise one or more tinting colorants that can be suitable dyes or pigments (or combinations) and can be used to provide a specific observable color, coloration, or hue in the resulting light-blocking elements. These materials are not chosen to provide the opacifying property described below for the (e) opacifying colorants and thus, tinting colorants are intended to be different materials than the (e) opacifying colorants.

Flame retardants can also be present and include such materials as antimony trioxide and decabromodiphenyl ethane, or any other material known in the textile art for this purpose.

Further details of useful (c) two or more additives are provided in the publications cited above in the section for the (a) porous particles.

(d) Aqueous Medium:

Water is the primary solvent used in an (d) aqueous medium in the foamable aqueous opacifying compositions, meaning that water comprises at least 75 weight % and up to and including 100 weight % of the total solvent weight. Auxiliary solvents (such as alcohols and ketones) that can be present must not adversely affect or harm the other components in the composition.

The (d) aqueous medium then, which is primarily water, comprises at least 30 weight % or at least 40 weight %, and up to and including 60 weight % or up to and including 65 weight %, of the total weight of the foamable aqueous opacifying composition.

(e) Opacifying Colorants:

The (e) opacifying colorants used in the present invention can be a single material or chosen from any suitable combination of materials such that the single or multiple materials typically absorb UV and visible electromagnetic radiation (defined above) to provide blackout properties (and facilitate light-blocking). The (e) opacifying colorants can be soluble dyes or pigments or combinations of each or both types of such materials. The (e) opacifying colorants are different compositional and functionally from the compounds defined above as the (c) two or more additives.

In most embodiments, the one or more (e) opacifying colorants are present within a volume of at least some (or all) of the discrete pores within the (a) porous particles, within the continuous polymeric binder of the (a) porous particles, or within both. The (a) porous particles can be used to "encapsulate" various (e) opacifying colorants as well as tinting colorants or others of the (c) two or more additives so they are kept isolated from the other components of the foamable aqueous opacifying composition and are additionally not exposed to the environment during element sewing or upon surface damage of the PFP light-blocking element.

While the (e) opacifying colorant(s) are not purposely chosen in type or amount for coloration and are materials that are chosen to be different from the tinting colorants described above.

Representative examples of (e) opacifying colorants that can be used individually or in combination include but are not limited to, visually neutral (that is, no color as observed using the unaided human eye) or black pigments or dyes, a carbon black, black iron oxide, graphite, aniline black, anthraquinone black, and combinations of colored pigments or dyes such as combinations of two or more cyan, magenta, green, orange, blue, red, and violet dyes. Such opacifying colorants or combinations thereof are characterized by a complete absence of hue and chroma and as such they appear black or visually neutral in color to the unaided human eye. A carbon black, a neutral or black pigment or dye (or combination thereof), or a combination of pigments or dyes other than carbon black, is particularly useful as an opacifying colorant. Combinations of dyes or pigments such as a combination of the subtractive primary-colored pigments (cyan, magenta, and yellow colored pigments) can also be used to provide a visually neutral (e) opacifying colorant.

The (e) opacifying colorant can be generally present in the foamable aqueous composition in an amount of at least 0.001 weight % and up to and including 0.5 weight %, or even at least 0.003 weight % and up to and including 0.2 weight % (for example, for use of one or more carbon blacks), all based on the total weight of the foamable aqueous opacifying composition (including the weight of all solvents). These amounts refer to the total amount of one or a mixture of (e) opacifying colorants.

Foamed Aqueous Opacifying Compositions

Foamed aqueous opacifying compositions can be prepared wherein an inert gas (such as air) is mechanically incorporated into the foamable aqueous composition as described above, which procedure is designed to provide a foam density of at least 0.1 $g/cm^2$ and up to and including 0.5 $g/cm^3$, or more likely of at least 0.15 $g/cm^3$ and up to and including 0.4 $g/cm^3$. Foam density can be determined gravimetrically by weighing a known volume of the foamed aqueous opacifying composition. The resulting foamed aqueous opacifying composition generally has a % solids of at least 35% or at least 40%, and up to and including 60% or up to and including 70%.

Components (a) through (e) of the foamed aqueous opacifying composition are generally present in the same relative amounts as described for the foamable aqueous opacifying composition (described above) as the foaming process does not appreciably add to or diminish the relative amounts of such components.

Treated Fabrics

Treated fabrics can be prepared using the procedures and materials described herein according to the present invention, comprising at least steps A) through D) defined below. Steps A), B), and C) are generally carried out in alphabetical order, and step D) can be carried out at any of various times in the inventive method, as described below.

A method according to the present invention is begun with step A) in which a scoured fabric of any desired composition is provided. Each scoured fabric useful herein generally has two opposing sides, for example, a face side and an opposing back side, and can be composed of any of the materials described below. The scoured fabrics can comprise various woven and nonwoven textile fabrics composed of one or more of nylon, polyester, cotton, aramid, rayon, polyolefin, acrylic wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethyl pentene, polyether ketone, (meth)acrylonitrile], and other porous materials that would be apparent to one skilled in the art as useful for providing woven or non-woven fabric articles. Each scoured fabric can have a dry thickness of at least 50 μm. Useful fabric materials can be obtained from a number of commercial textile mills or fabric distributors.

Each fabric material used in step A) has been "scoured," which is the textile term for washing or cleaning fibers to remove oils or other unwanted materials such as softeners present from fiber spinning, prior to any mordanting and dyeing operation. Scouring helps assure uniform coloration and good penetration of dyes within the fabric fibers. The conditions for scouring fabric materials are well known in the textile art.

The scoured fabrics are also generally "tentered" and "heat-set" on suitable tentering racks. Tentering sets the warp and weft of woven fabrics at right angles to each other and stretches and sets the fabric to its final dimensions. The scoured fabric is typically stretched using a tenter frame, consisting of chains fitted with pins or clips to hold the selvedges of the scoured fabric, and travels on tracks. Useful conditions and equipment for tentering are well known in the textile art. Heat-setting is the process of providing dimensional stability to the scoured and tentered fabric.

Once a scoured fabric having a face side and a back side is provided, step B) is carried out in which a non-foamed color-masking composition (or aqueous-based formulation) is disposed only on the back side of the scoured fabric to form a treated having a coated back side and an uncoated face side. Such non-foamed color-masking composition is not purposely applied to the face side of the scoured fabric. The essential and optional components of the non-foamed color-masking composition are described below, but these components can be formulated or mixed in a suitable aqueous medium (that is, predominantly water) using suitable mixers such as an overhead stirrer attached with a Cowles blade, impeller or turbine blade in order to break up any agglomerated materials and to create a stable solution or suspension (or dispersion) of fine solids. Mixing should be carried out in a manner such that foaming or bubble formation is minimized, and the presence of defoaming agents can help with this also.

The non-foamed color-masking composition (or formulation) can be applied as a conformal coating to the back side of the scoured fabric using a suitable application means, such as wrapped wire rod coating, blade coating, spray coating, air knife coating, gravure coating, reverse roll coating, slot coating, extrusion hopper coating, slide coating, curtain coating, rotary screen coating, pad coating, and other techniques that would be readily apparent to one skilled in the coating art.

The amount of non-foamed color-masking composition disposed in this manner can vary appropriately for a particular color-masking need, but in general, after the step C) of drying (described below) the resulting dried and non-foamed color-masking composition should be present on the back side of the scoured fabric at a dry coverage of at least 5 g/m$^2$ or of at least 15 g/m$^2$ and up to and including 60 g/in$^2$ or up to and including 75 g/m$^2$. Using the teaching provided herein, a skilled worker in the art would readily understand how to formulate the non-dried (or wet) non-foamed color-masking composition using desired components and aqueous medium, and the appropriate wet coating coverage, in order to obtain the desired dry coverage.

After the non-foamed color-masking composition has been disposed on the back side of the scoured fabric, the non-foamed color-masking composition is subjected to the C) drying step to form a dried and non-foamed color-masking composition with the noted dry coverage. This drying operation can be carried out using any suitable conditions and equipment by simple evaporation of water and any other solvents, as long as the desired properties (such as color masking) are not diminished. Generally, the C) drying step can be accelerated by known techniques such as convection heating including forced air or infrared heating, or other means that would be readily apparent to a skilled worker in the art. For example, drying could be achieved for at least 60 seconds and up to and including 10 minutes by blowing drying air over the wet surface, or by passing the applied non-foamed color-masking composition on the scoured fabric through a suitable drying oven or apparatus for a suitable time to remove at least 98 weight % of all liquids in the applied non-foamed color-masking composition. Drying temperatures can vary from at least 110° C. and up to and including 150° C. It may be convenient to dry the applied non-foamed color-masking composition on the scoured fabric while it is carried on a conveying means such as conveying belt or tenter frame through a drying unit or apparatus to achieve this purpose. A skilled worker would understand how to design such drying conditions and operations using conveying and drying equipment known in the art, for example, as described for example in U.S. Pat. No. 4,118,526 (Gregorian et at), the disclosure of which is incorporated herein by reference. The types and conditions of drying will vary depending upon the amount of aqueous medium within the non-foamed color-masking composition and upon the wet coating coverage.

A heat-setting step D) is also carried out according to the method of this invention to provide an inventive treated fabric. One can choose to vary out step D) heat-setting at various times during the inventive method: (1) only between step A) and step B); (2) only after step C); (3) or both between steps A) and step B) and after step C). When the step B) heat-setting is carried out between step A) and step B), the result is a heat-set scoured fabric. When step B) heat-setting is carried out after step C), the result is a heat-set treated fabric, or a treated fabric according to the present invention. Step B) heat-setting can occur at the same time as the step C) drying using the same conditions and equipment for both operations. Thus, combining step C) and step D) would be a convenient embodiment of the present invention. In this and other embodiments, however, a separate heat-setting operation also can be carried out between step A) and step B).

If D) heat-setting is carried out between step A) and step B), it can be carried out under conditions and using equipment that would be readily apparent to one skilled in the art, including but not limited to, a stenter or tenter process (equipment) at temperatures that can range from at least 150° C. or from at least 200° C. and up to and including 230° C. for at least 5 seconds and up to and including 5 minutes. The conditions for heat-setting can be controlled so that neither the scoured fabric nor the later treated fabric is damaged in any manner, and so that the desired properties in the resulting treated fabric are not diminished. Sometimes the heat-setting operation is known in the art as "fixing" or "curing," as described for example, in U.S. Pat. No. 4,118,526 (noted above).

The color-masking composition used in the practice of this invention is "non-foamed," meaning that the composition is not purposely foamed and it typically has a foam density of greater than 0.8 g/cm$^3$ or greater than 1.0 g/cm$^3$ so that bubbles or foam voids or cells are minimized as much as possible. Defoaming agents can be included in the non-foamed color-masking composition to achieve this result if desired. Mixing of the components described below may produce a minimal amount of foaming but generally the foam voids or cells will readily dissipate prior to application to the back side of the scoured fabric since there are no foaming agents or foam stabilizers purposely added to the non-foamed color-masking composition. Foam density can be determined gravimetrically by a skilled worker in the art, by weighing a known volume of the non-foamed color-masking composition using known procedures and calculations.

The non-foamed color-masking composition used in the present invention is formulated to have % solids of at least 10% or at least 20%, and up to and including 40% or up to and including 80%, which can be measured using known procedures. The materials forming the solids in such compositions are described below and are generally dispersed within an aqueous medium comprising predominantly water (that is, water comprises at least 75 weight % of total liquids). Besides water, various water-miscible organic solvents can also be present as long as they do not diminish the desired properties of the non-foamed color-masking composition or damage the scoured fabric on which it is disposed. Typically, the aqueous medium is composed of water in an amount of at least 90 weight % and up to and including 100 weight % based on the total solvents.

An essential component of the non-foamed color-masking composition comprises one or more tinting components that provide the color-masking properties (described above and below) when incorporated between the scoured fabric and a foamed layer such as a cured, crushed, and dried foamed opacifying layer as described below in the PFP light-blocking elements of the present invention. Useful tinting components can be incorporated in this non-foamed color-masking composition singly or in any desired combination, and can include but are not limited to, organic or inorganic water-soluble or water-dispersible dyes, pigments, and other materials that are known for imparting coloration to a composition, fabric, or substrate such as a scoured fabric.

Water-soluble or water-dispersible organic and inorganic dyes include but are not limited to, dispersed dyes, cationic dyes, direct dyes, reactive dyes, acid dyes, and combinations thereof that would be readily apparent to one skilled in the art of formulating aqueous colored compositions. Useful organic and inorganic pigments include but are not limited to, opacifying or tinting mineral fillers such as talc, clays, calcium carbonate, barium sulfate, silica, zinc oxide, zinc sulfide, titanium dioxide, and others that would be known in the art. Such organic or inorganic pigments can be used singly or in combination with each other or in combination with suitable dyes noted above.

In some embodiments of this invention, the one or more tinting components can be chosen from titanium dioxide, titanium-coated mica, barium sulfate, calcium carbonate, zinc oxide, azo pigments, azo pigment lakes, Naphthol pigments, and combinations of these materials.

Whatever tinting components are used, one or more of them are chosen such that the disposed non-foamed color-masking composition, generally in dry form, effectively reduces visual perception, when viewed from the uncoated face side of the treated fabric and when a cured, crushed, and dried foamed opacifying layer has been disposed on the coated back side, so that the reduced visual perception when measured by a $\Delta E$ value that is determined from $\Delta L^*$, $\Delta a^*$, and $\Delta b^*$ CEILAB color values, is determinable to be <2, 1.5, or even 1.0, compared to visual perception from the uncoated face side of the same treated fabric when the cured, crushed, and dried foamed opacifying layer has been omitted.

In most embodiments, this $\Delta E$ value is evaluated using a PFP light-blocking element according to this invention, and the "foamed coating" identified above is a cured, crushed, and dried foamed opacifying layer as described herein. The choice of tinting components and amount(s) may require some routine experimentation, but the teaching provided herein, particularly in the working examples below, provides direction to enable a skilled worker to determine useful tinting components and amounts to achieve the desired color masking as defined by the $\Delta E$ value. The tinting components useful here can be purchased from a number of commercial sources or they can be readily prepared using known starting materials and synthetic methods.

The amount of the one or more tinting components incorporated into the non-foamed color-masking composition can be varied as noted. In many embodiments, however, the total of the one or more tinting compositions present in the non-foamed color-masking composition (or formulation, before drying) is at least 1 weight % or at least 10 weight %, and up to and including 15 weight % or up to or up to and including 35 weight %, based on the total non-dried weight of the non-foamed color-masking composition.

One or more film-forming polymeric binders are also present in the non-foamed color-masking composition as a second essential component, and these one or more film-forming polymeric binders have a $T_g$ of less than 25° C. or of less than 5° C. While not every one of the film-forming polymeric binders must have the noted $T_g$ value, when a mixture of two or more film-forming polymeric binders is used, the "composite" or collective $T_g$ of the mixture should meet this requirement. Representative examples of useful one or more film-forming polymeric binders include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, and polyesters, silicone polymers or a combination of two or more of these organic polymers. Such film-forming polymeric binders are readily available from various commercial sources or prepared using known starting materials and synthetic conditions. The film-forming polymeric binders can be anionic, cationic or nonionic in total charge. A useful class of film-forming polymeric binders includes aqueous latex polymer dispersions such as acrylic latexes that can be ionic or nonionic colloidal dispersions of acrylate polymers and copolymers. Film-forming aqueous latexes suitable for use include acrylic homopolymers (acrylates and methacrylates) and acrylic-styrenic copolymers, styrene-butadiene latexes, poly(vinyl chloride) and poly(vinylidene chloride) latexes, poly(vinyl pyridine) latexes, and poly(acrylonitrile) latexes. Examples of suitable commercially available useful film-forming polymeric binders include those sold by Covestro AG under the trade names NeoRez® A-1 150, NeoCryl® A-6093.

It is useful to include one or more film-forming polymeric binders that include one or more crosslinkable binder materials (either self-crosslinkable or crosslinkable in the presence of a suitable crosslinking agent) and which are activated chemically with heat, radiation, or other means in order to provide strength to the resulting dried non-foamed color-masking composition. The crosslinking agent is a chemical having functional groups capable of reacting with reactive sites on the film-forming polymeric binder under curing conditions to thereby produce a crosslinked structure. Examples of suitable crosslinking agents include multifunctional aziridines, aldehydes, and epoxides. Crosslinking can be carried out during either or both of the step C) drying operation or the step D) heat-setting operation.

Useful film-forming polymeric binder materials and crosslinking agents can be obtained from a number of commercial sources, as noted above, or prepared using known starting materials and synthetic methods.

In many embodiments of the present invention, the weight ratio of one or more film-forming polymeric binders to the one or more tinting components in the non-foamed color-masking composition (or layer), can be at least 50:1 or at least 10:1 and up to and including 1:10 or up to and including 1:50.

Various optional addenda may be included in the non-foamed color-masking composition (both in wet form and in dried form), which addenda do not adversely affect the desired properties of the treated fabric and resulting light-blocking elements. Such optional addenda include but are not limited to, softening agents, defoaming agents, fire retardant agents, crosslinking agents, thickeners, biocides, dispersants for tinting components, surfactants, and anti-static agents, all in suitable amounts that would be readily determined by one skilled in the art and routine experimentation. Such materials can be readily obtained from various commercial sources. It is essential, however, that such optional addenda do not include materials that cause undesirable foaming.

Once steps A) through D) described above are carried out, the resulting treated fabric can be rolled up, for example, using a suitable take-up roll, so that the dried and non-foamed color-masking composition on the back side of the treated fabric is in intimate contact with the face side of adjacent scoured fabric (thus, in a "back-to-front" rolled relationship). Such treated fabrics are also considered PFP treated fabrics. Such rolls of treated fabric can be used at any time to provide a PFP light-blocking element according to the present invention, or they can be used for other purposes known to those skilled in the textile arts. The rolled up treated fabrics can be stored as long as one wishes under suitable storage conditions, or they can be transported to another site for further operations such as textile finishing operations. Of course, before such treated fabrics are rolled up, a printed image or design (using technologies described above) can be provided on the face side of the scoured fabric at any suitable point in the process of carrying out steps A) through D). Alternatively, when such rolls of treated fabrics are unrolled, a printed image or design can be provided on the face side of the scoured fabric at any suitable time.

In some embodiments of the method of the present invention, steps A) through D) described above are followed with additional steps E) through I), in order, unless otherwise indicated. Such methods can further comprise step E) in which a foamed aqueous opacifying composition is disposed onto the dried and non-foamed color-masking composition in a treated fabric, to provide a foamed coating on the back side of the treated fabric. In many embodiments, the foamed aqueous opacifying composition can be disposed directly onto the dried and non-foamed color-masking composition wherein "directly" means there are no intervening or intermediate layers.

This E) disposing step can be carried out using any suitable coating equipment and coating procedures known in the art for such coating purposes including but not limited to, blade coating, gap coating such as "knife-over-roll" and "knife over table" operation, floating knife, slot die coating, and slide hopper coating. Useful disposing or layer-forming means are described, for example, in U.S. Pat. No. 4,677,016 (Ferziger et al.), the disclosure of which is incorporated herein by reference, as well as in Research Disclosure No. 308119, December 1989, pages 1007-1008 and in references cited therein, which also describe conventional drying and curing conditions and equipment necessary for the inventive methods.

The useful foamable aqueous opacifying compositions described above are suitably foamed also as described above. The amount of foamed aqueous opacifying composition to be applied to the non-foamed color-masking composition should be sufficient to provide an eventual dry coverage of less than or equal to 10 ounces (mass)/yard$^2$ (or less than or equal to 339.08 g/m$^2$), or a dry coverage of at least 1.5 ounces (mass)/yard$^2$ (or 50.86 g/m$^2$) and up to and including 7 ounces (mass)/yard$^2$ (237.35 g/m$^2$).

Following step E), the disposed foamed aqueous opacifying composition is dried in step F) to form a dried foamed opacifying composition. There may be some partial curing of the (b) binder material during this drying step to form corresponding (b') matrix material. The F) drying step can be accomplished by any suitable means to evaporate the aqueous medium to a significant extent (that is, removal of at least 95 weight % of solvents) using various convection means, similar to the drying of the coated fabric in step C) noted above, including heating with warm or hot air, or subjecting the coating to microwaves or IR irradiation at a suitable temperature and time. No other foamed layers of any type and for any purpose are formed on the non-foamed color-masking composition of the treated fabric. Thus, there is a single cured, crushed, and dried foamed layer on the back side of the scoured fabric.

Following drying, step G) is carried out by crushing (or densifying) the dried foamed opacifying composition while it and the treated fabric (comprising the dried and non-foamed color-masking composition) are passed in intimate contact between a pair of pressure rollers to provide a crushed and dried foamed opacifying layer on the back side of the treated fabric. The mechanical pressure of the pair of pressure rollers densifies the foam cells in the dried foamed opacifying layer. The original thickness of the dried foamed opacifying layer can be reduced by at least 20% of its original thickness during this crushing operation. The thickness of the layer both before and after step G) can be determined by a known technique such as laser profilometry. For example, step G) can be carried out using the pair of pressure rollers at any suitable temperature including room temperature (for example, 20° C.) and up to and including 90° C., or more likely at a temperature of at least 20° C. and up to and including 50° C. A useful step G) crushing pressure can be determined using routine experimentation depending upon several factors including the composition and foam density of the dried foamed opacifying layer, the type and thickness of scoured fabric being used, and the thickness of the dried and non-foamed color-masking layer sandwiched between the scoured fabric and the dried foamed opacifying layer. For example, a useful pressure during crushing between the pair of pressure rollers can be at least 3.5 kN/m (or about 20 lb/linear inch) and up to and including 70 kN/m (or about 400 lb/linear inch).

During or after step G), the crushed and dried foamed opacifying layer can be cured in step H) to form a cured, crushed, and dried foamed opacifying layer. The extent of the step H) curing needed to convert most or all of the (b) binder material to the (b') binder matrix can be determined by routine experimentation by a skilled artisan using the teaching provided herein. For example, the step H) curing can be accomplished using heat or infrared radiation or other conditions that would be understood by one skilled in the art at temperatures of from 100° C. to 160° C. for a suitable time for example up to 10 minutes.

The inventive method can also include step I) in which a non-foamed functional composition formulation (described below) is disposed (directly with no intervening layers) on the cured, crushed, and dried foamed opacifying layer on the back side of the treated fabric to provide a non-foamed functional composition. This step I) can be carried out at some point after the step E). In some embodiments of the inventive method, step I) can be carried out after step F), or after step G), but still in other embodiments, step I) can be carried out after step H). In some of these alternatives, the disposed non-foamed functional composition will be subjected to the same crushing and/or curing conditions as the foamed opacifying composition.

At whatever time after the step E), the non-foamed functional composition can be disposed in step I) on the foamed aqueous opacifying composition to provide a resulting dry coverage of at least 0.5 g/cm² and up to and including 10 g/cm². Further details of this non-foamed functional composition are provided in U.S. Pat. No. 10,696,813 (Lobo et al.), 10,731,022 (Nair et al.), 11,370,924 (Nair et al.) and 11,377,567 (Nair et al.), the disclosures of all of which are incorporated herein by reference. The non-foamed functional composition formulation can be disposed directly on the foamed opacifying layer using any number of suitable application techniques such as uniformly or non-uniformly spraying, wrapped wire rod coating, rotary screen coating, air knife coating, screen printing, gravure coating or flexographic printing (or other offset coating techniques), reversed roll coating, slot coating, gap coating, blade coating, extrusion hopper coating, roll coating, slide coating, curtain coating, spray coating, pad coating, and other techniques that would be readily apparent to one skilled in the art.

The applied non-foamed functional composition formulation can be dried by simple evaporation of water and any other solvents, to form the non-foamed functional composition on the dried foamed opacifying layer such as in the step F). The drying can also be carried out or continued in the step H) curing described above.

The result of these steps A) through I) is the formation of a PFP light-blocking element according to the present invention in which the cured, crushed, and dried foamed opacifying layer comprises the following components (a), (b'), (c), (d), and (e), further details of which are described above:
  (a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;
  (b') a binder matrix that is present in an amount of at least 10 weight % and up to and including 80 weight %;
  (c) two or more additives that are present in a total amount of at least 0.0001 weight % and up to and including 40 weight %, the two or more additives comprising at least one foaming surfactant and at least one compound that is a foam stabilizer;
  (d) less than 5 weight % of an aqueous medium; and
  (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm,
  all amounts of the (a) porous particles, (b') binder material, (c) two or more additives, (d) aqueous medium, and (e) opacifying colorant being based on the total weight of the cured, crushed, and dried foamed opacifying layer.

Such PFP light-blocking element can also comprise a non-foamed functional composition disposed on the cured, crushed, and dried foamed opacifying layer, which non-foamed functional composition comprises as essential components, glass particles or organic polymeric particles having a mode particle size of at least 5 μm and up to and including 100 μm, in an amount of at least 5 weight % and up to and including 99 weight %, and one or more water-soluble or water-dispersible organic polymeric binders, based on the total weight of the non-foamed functional composition.

The non-foamed functional composition can be present at a dry coverage of at least 0.5 g/m² or of at least 1 g/m² and up to and including 20 g/m² or up to and including 30 g/m².

The present invention also includes a method that can be used to provide a PFP treated fabric, which method consists of steps A), B), C), and D), identified above, in order, followed by rolling up the PFP treated fabric so that the dried and non-foamed color-masking composition on the coated back side of the treated fabric is in intimate contact with the uncoated face side of adjacent treated fabric. Such rolls can be formed and then used for later operations on-site or after transport to another site such as a textile mill.

For example, this embodiment of steps can be followed at a later time by unrolling the PFP treated fabric and carrying out steps E) through I), as described above, to form a PFP light-blocking element according to the present invention.

In all embodiments of the PFP light-blocking elements according to the present invention, printing images or designs of many kinds on one or both outer surfaces can be carried out using known imaging methods, including but not limited to inkjet printing, screen printing, or flexographic printing, thereby forming printed images of text, pictures, symbols, or combinations thereof. Such printed images or designs can be visible, or they can be invisible to the unaided eye and detectable using other means (for example, using fluorescent dyes in the printed images). In addition, the outer surface of the non-foamed functional composition or the uncoated face side of the scoured fabric can be covered by suitable means with a colorless layer to provide a desired protective finish and to protect any images or designs.

A thermally printed image can be formed on the face side of the prepared for print light-blocking element, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches (containing appropriate one or more dye sublimation thermal transfer colorants) with or without a thermal colorless (clear) patch. Useful details of such a process are provided in U.S. Pat. No. 3,363,557 (Blake), U.S. Pat. No. 3,952,131 (Sideman), U.S. Pat. No. 4,139,343 (Steiner), U.S. Pat. No. 6,036,808 (Shaw-Klein et al), U.S. Pat. No. 8,628,185 (Hale et al), U.S. Pat. No. 9,315,682 (Delys et al.), U.S. Pat. No. 4,117,699 (Renaut), U.S. Pat. No. 4,097,230 (Sandhu), U.S. Pat. No. 4,576,610 (Donenfeld), U.S. Pat. No. 5,668,081 (Simpson et al.), U.S. Pat. No. 7,153,626 (noted above), and U.S. Pat. No. 10,145,061 (Nair et al.), the disclosures of all of which are incorporated herein by reference.

Prepared for Print (PFP) Light-Blocking Elements

The inventive methods described above, can be used to provide treated fabrics as described above, as well as inventive PFP light-blocking elements. Each PFP light-blocking element comprises a scoured and heat-set fabric having an uncoated face side and a coated back side. On the coated back side, a dried and non-foamed color-masking composition is disposed as described above, at a coverage of at least 5 g/m² and up to and including 75 g/m². As noted above, the dried and non-foamed color-masking composition comprises one or more tinting components and a film-forming polymeric binder having a $T_g$ of less than 25° C., in the amounts described above, and thus forms a PFP treated fabric.

The PFP light-blocking element further comprises a cured, crushed, and dried foamed opacifying layer disposed on the dried and non-foamed color-masking composition, having the following general composition:
  (a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;
  (b') a binder matrix that is derived from a (b) binder material and is present in an amount of at least 10 weight % and up to and including 80 weight %;
  (c) two or more additives that are present in a total amount of at least 0.0001 weight % and up to and including 40 weight %, the two or more additives comprising at least one foaming surfactant and at least one compound that is a foam stabilizer;
  (d) less than 5 weight % of an aqueous medium; and
  (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm,
  all amounts of the (a) porous particles, (b') binder material, (c) two or more additives, (d) aqueous medium, and (e) opacifying colorant being based on the total weight of the cured, crushed, and dried foamed opacifying layer.

It is also essential in the PFP light-blocking elements of the present invention that the following conditions apply:
  the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value that is determined from ΔL*, Δa*, and Δb* CEILAB color values, to be <2 (or ≤1.5 or ≤1.0), compared to visual perception on the uncoated face side of the same treated fabric when the cured, crushed, and dried foamed opacifying layer has been omitted; and
  a light-blocking element like that prepared for print (PFP) light-blocking element, but from which the dried and non-foamed color-masking layer has been omitted, exhibits a ΔE value that is determined from ΔL*, Δa*, and Δb* CEILAB color values, to be >2 (or >3) when viewed from the face side of the scoured fabric, compared to the prepared for print (PFP) light-blocking element comprising the dried and non-foamed color-masking layer.

In many embodiments, such PFP light-blocking elements can further comprise a non-foamed functional composition at a coverage of at least 0.5 g/cm² and up to and including 10 g/cm² disposed on the cured, crushed, and dried foamed opacifying layer. The non-foamed functional composition, as described above, can comprise glass particles or organic polymeric particles having a mode particle size of at least 5 µm and up to and including 100 µm, in an amount of at least 5 weight % and up to and including 99 weight %, and one or more water-soluble or water-dispersible organic polymeric binders. based on the total weight of the non-foamed functional composition.

As noted above, the PFP light-blocking elements of this invention can have one or more images or designs printed on either or both outer surfaces. For example, one or more thermally-printed images can be provided on the uncoated face side of the scoured fabric.

The PFP light-blocking elements of the present invention can be provided in roll form so that the functional layer that is disposed over the cured, crushed, and dried foamed opacifying layer is in intimate contact with the uncoated face side of the scoured fabric of adjacent PFP light-blocking element.

The present invention provides at least the following embodiments and combinations thereof, but other combinations of features are considered to be within the present invention as a skilled artisan would appreciate from the teaching of this disclosure:

1. A prepared for print (PFP) light-blocking element, comprising:
  a scoured fabric having a face side and a back side, and having on the coated back side, a dried and non-foamed color-masking composition at a coverage of at least 5 g/m² and up to and including 75 g/m², the dried and non-foamed color-masking composition comprising one or more tinting components and a film-forming polymeric binder having a $T_g$ of less than 25° C., forming a treated fabric with an uncoated front side and a coated back side, and
  the light-blocking element further comprising a cured, crushed, and dried foamed opacifying layer disposed on the dried and non-foamed color-masking composition, to form a prepared for print (PFP) light-blocking element,
  wherein:
  the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value as determined from ΔL*, Δa*, and Δb* CEILAB color values, to be <2, compared to visual perception on the uncoated face side of the same treated fabric when the cured, crushed, and dried foamed opacifying layer has been omitted, a light-blocking element like that prepared for print (PFP) light-blocking element, but from which the dried and non-foamed color-masking layer has been omitted, exhibits a ΔE value as determined from ΔL*, Δa*, and Δb* CEILAB color values, to be >2 when viewed from the face side of the scoured fabric, compared to the prepared for print (PFP) light-blocking element comprising the dried and non-foamed color-masking layer, and the cured, crushed, and dried foamed opacifying layer comprises:

(a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b') a binder matrix that is present in an amount of at least 10 weight % and up to and including 80 weight %;

(c) two or more additives that are present in a total amount of at least 0.0001 weight % and up to and including 40 weight %, the two or more additives comprising at least one foaming surfactant and at least one compound that is a foam stabilizer;

(d) less than 5 weight % of an aqueous medium; and (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm, all amounts of the (a) porous particles, (b') binder material, (c) two or more additives, (d) aqueous medium, and (e) opacifying colorant being based on the total weight of the cured, crushed, and dried foamed opacifying layer.

2. The prepared for print (PFP) light-blocking element of embodiment 1, further comprising:

a non-foamed functional composition at a coverage of at least 0.5 g/cm² and up to and including 10 g/cm² disposed on the cured, crushed, and dried foamed opacifying layer, the non-foamed functional composition comprising glass particles or organic polymeric particles having a mode particle size of at least 5 μm and up to and including 100 μm, in an amount of at least 5 weight % and up to and including 99 weight %, and one or more water-soluble or water-dispersible organic polymeric binders, based on the total weight of the non-foamed functional composition.

3. The prepared for print (PFP) light-blocking element of embodiment 1 or 2 that has one or more images printed on an outer surface thereof.

4. The prepared for print (PFP) light-blocking element of embodiment 3 that has one or more thermally-printed images on an outer surface thereof.

5. The prepared for print (PFP) light-blocking element of any of embodiments 1 to 4, wherein the one or more tinting components are chosen from titanium dioxide, titanium coated mica, barium sulfate, calcium carbonate, zinc oxide, azo pigments, azo pigment lakes, Naphthol pigments, and combinations of these materials.

6. The prepared for print (PFP) light-blocking element of any of embodiments 1 to 5, wherein the film-forming polymeric binder in the dried and non-foamed color-masking composition comprises a crosslinkable binder material.

7. The prepared for print (PFP) light-blocking element of any of embodiments 1 to 6, wherein the weight ratio of the total of the one or more tinting components to the film-forming polymeric binder in the dried and non-foamed color-masking composition is at least 5:1 and up to and including 20:1.

8. The prepared for print (PFP) light-blocking element of any of embodiments 1 to 7, wherein the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value as determined from ΔL*, Δa*, and Δb* CEILAB color values, to be <1.0, compared to visual perception on the uncoated face side of the same treated fabric when the cured, crushed, and dried foamed opacifying layer has been omitted.

9. The prepared for print (PFP) light-blocking element of any of embodiments 1 to 8 that is provided in roll form so that the cured, crushed, and dried foamed opacifying layer is in intimate contact with the face side of the scoured fabric of adjacent prepared for print (PFP) light-blocking element.

10. The prepared for print (PFP) light-blocking element of any of embodiments 2 to 9 that is provided in roll form so that the non-foamed functional composition is in intimate contact with the face side of the scoured fabric of adjacent prepared for print (PFP) light-blocking element.

11. The prepared for print (PFP) light-blocking element of any of embodiments 2 to 10, wherein the glass particles are hollow glass particles.

12. The prepared for print (PFP) light-blocking element of any of embodiments 2 to 11, wherein the non-foamed functional composition further comprises one or more of a lubricant, tinting agent, coating aid, crosslinking agent, and a thickener.

13. The prepared for print (PFP) light-blocking element of any of embodiments 1 to 12, wherein the (e) opacifying colorant comprises a carbon black that is present at least within the pores of the (a) porous particles.

The following Examples are provided to illustrate the practice of this invention and are not meant to be limiting in any manner. The following materials were used in the Examples.

Materials Used in the Following Examples

Neocryl® 1120, a solvent-free, high solids, modified acrylic-styrene copolymer dispersion was purchased from DSM now supplied by Coverstro AG.

Tego® Viscoplus 3010, a pH independent, associative thickener was purchased from Evonik.

Maxxsperse® 3000, a sodium polyacrylate dispersant was obtained from MCTRON technologies.

The foamable aqueous composition (CF drapery compound) was made from a formulation comprising: a self-crosslinking copolymer (P1) derived from n-butyl acrylate, ethyl acrylate, and N-methylol acrylamide using a known procedure, and having a glass transition temperature ($T_g$) of approximately −25° C. as the (b) binder material from which the (b') matrix material was derived; (c) additives titanium dioxide; clay filler; a flame retardant; a foaming surfactant; and a foam stabilizing agent.

TiPure™ R-900 titanium dioxide, the white tinting material was purchased from Chemours.

The scoured fabrics used in the Examples below were composed of a plain weave white polyester, having a weight of about 50-200 g/m².

A CF drapery compound was made from a formulation comprising: a self-crosslinking copolymer (P1) derived from n-butyl acrylate, ethyl acrylate, and N-methylol acrylamide using a known procedure, and having a glass transition temperature ($T_g$) of approximately −25° C. as the (b) binder material from which the (b') matrix material was derived; (c) additives titanium dioxide; clay filler; a flame retardant; a foaming surfactant; and foam stabilizing agent. The self-crosslinking copolymer P1 was also used as the (iv) water-soluble or water-dispersible organic polymeric binder in the non-foamed functional composition formulations.

Measurements:

The mode particle size of the (a) porous particles was measured using a Sysmex FPIA-3000 Flow Particle Image Analyzer available from Malvern Panalytical. The particle size of the dispersed pigments was determined using light scattering.

The porosity of the (a) porous particles was measured using a modified version of the known mercury intrusion porosimetry method.

A Hunter Labs UltraScan XE colorimeter equipped with an integrating sphere and a pulsed Xenon light source and appropriate filters for standard D65 illumination was used in conjunction with the CIELAB color space to calculate specific values for the lightness (L*), red-green character (a*), and yellow-blue character (b*) of the face side of each Example and Comparative Examples.

These ΔE values were instrumentally determined by measuring the E values of face of the fabric after providing the non-foamed color masking layer on the back side of the scoured fabric and then measuring the E value from the uncoated face after applying the cured, crushed, and dried foamed opacifying layer over the non-foamed color masking layer on the back side. The ΔE values described herein for treated fabrics prepared according to the present invention are determined by comparing: (1) the CIELAB L*, a*, and b* values for a treated fabric according to the present invention (having a color-masking composition as described below disposed on the back side of the scoured fabric) with the respective CIELAB L*, a*, and b* values of a scoured fabric that has a foamed coating such as the dried, crushed, and foamed opacifying layer described hereinbelow, disposed on the coated back side of the scoured fabric from which a non-foamed color-masking composition has been omitted; and (2) comparing the respective CIELAB L*, a* and b* values to provide differences, that is ΔL*, Δa*, and Δb* values. The ΔE values can be a combination of one or more of the ΔL*, Δa*, and Δb* values. According to the present invention, ΔE is <2, or ≤1.5, or even ≤1.0. It is desired that ΔE be as close to zero as possible.

Preparation of (a) Porous Particles PP:

The (a) porous particles (PP) used in the Invention Examples containing a polymer derived from cellulose acetate butyrate as a continuous polymeric phase, discrete pores, and carbon black as the (e) opacifying colorant were prepared as described in U.S. Pat. No. 9,963,569 (noted above), the preparation of which being incorporated herein by reference. The resulting (a) porous particles had a particle size of 5 μm, a porosity of 50.6%, and a moisture content of 56%.

Preparation of Foamable Aqueous Opacifying Compositions and Foamed Aqueous Opacifying Compositions:

A foamable aqueous opacifying composition containing (a) porous particles PP was prepared by combining 80 grams of (a) porous particles PP with 1470 grams of CF drapery compound (that contains a sulfosuccinamide as a foaming surfactant and ammonium stearate as a foam stabilizing agent). (a) Porous particles PP were dispersed into the mixture by stirring with a Cowles blade at ambient temperature for 30-60 minutes. The resulting foamable aqueous opacifying composition was used to prepare a foamed aqueous opacifying composition under pressure using an Oakes 2M Laboratory Mixer Model 2MBT1A.

Non-Foamed Color-Masking Compositions and Application to Scoured Fabrics to Form Treated Fabrics, Invention Examples 1-3 and Comparative Examples 1-3

Titanium dioxide (50 g) was dispersed in water (58.4 g) and Neocryl® 1120 (88.6 g at 54.7% solids) using Maxxsperse® (2 g, at 50% solids). To the resulting dispersion was added Tego® Viscoplus 3010 (0.8 g at 57.4% solids). This white color masking composition was coated using a gap coating blade on the scoured polyester fabric using 0.0254 mm, 0.0508 mm, and 0.0762 mm gaps, resulting in 16 g/m², 33 g/m², and 49 g/m², respectively of the dried non-foamed color masking composition.

Over each of these coatings, the cured, crushed, and dried foamed aqueous opacifying composition was provided at a density of 0.2 g/cm³.

As Comparative Examples 1-3, corresponding to the Invention Examples 1-3 described above, respectively, the foamed aqueous compositions were coated on uncoated back side of a scoured fabric but without an applied non-foamed color masking composition on that back side.

As mentioned above, a ΔE of <2, or ≤1.5, or even ≤1 is desired in order for the non-foamed color-masking layer to hide the cured, crushed and foamed opacifying layer coated over it from being apparent as viewed from the face side of the scoured fabric. From the TABLE shown below it can be seen that the ΔE values were all greater than 2 for the Comparative Examples vs. each of the related Invention Examples 1-3, where the ΔE values were much lower and within desired metrics.

Further as shown in the last column of the following TABLE, the ΔE is <1.0 when observing from the uncoated face side of the scoured fabric with the non-foamed color-masking layer disposed on the back side of the scoured fabric, with and without the cured, crushed, and dried foamed opacifying layer applied over the non-foamed color-masking layer. These results demonstrate the necessity for the presence of the non-foamed color-masking layer on the back side of the scoured fabric to achieve the advantages noted for the present invention, including an effective hiding or masking of the cured, crushed, and dried foamed opacifying layer disposed on the coated back side of the treated fabric so that it does not show through to the face side.

TABLE

| Example | Non-foamed Color-Masking Layer | Cured, Crushed, & Foamed Opacifying Layer on Back Side | ΔE between Inventive Example and Comparative Example | ΔE of Non-foamed Color-masking Layer with and without Cured, Crushed, & Foamed Opacifying Layer |
|---|---|---|---|---|
| Comparative 1 | None | Yes | 2.92 | NA |
| Invention 1 | 16 g/m² | Yes | | 0.5 |
| Comparative 2 | None | Yes | 3.46 | NA |
| Invention 2 | 33 g/m² | Yes | | 0.39 |
| Comparative 3 | None | Yes | 3.03 | NA |
| Invention 3 | 49 g/m² | Yes | | 0.6 |

While these examples were carried out using a white-colored non-foamed color-masking layer, any tint can be present in non-foamed color-masking layers to match a color on the uncoated face side of the scoured fabric and to prevent color distortion of the uncured face side due to the presence of the cured, crushed, and dried foamed opacifying layer on the back side of the treated fabric.

The invention has been described in detail with particular reference to certain preferred embodiments thereof, but it will be understood that variations and modifications can be obtained within the spirit and scope of the invention.

The invention claimed is:

1. A prepared for print (PFP) light-blocking element, comprising:
    a scoured fabric having a face side and a back side, and having on the back side, a dried and non-foamed color-masking composition at a coverage of at least 5 g/m² and up to and including 75 g/m², the dried and non-foamed color-masking composition comprising one or more tinting components and a film-forming polymeric binder having a $T_g$ of less than 25° C., forming a treated fabric with an uncoated front side and a coated back side, and
    the light-blocking element further comprising a cured, crushed, and dried foamed opacifying layer disposed on the dried and non-foamed color-masking composition, to form a prepared for print (PFP) light-blocking element,
    wherein:
    the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value as determined from ΔL*, Δa*, and Δb* CEILAB color values, to be <2, compared to visual perception on the uncoated face side of the same treated fabric when the cured, crushed, and dried foamed opacifying layer has been omitted,
    a light-blocking element prepared as a print (PFP) light-blocking element, but from which the dried and non-foamed color-masking layer has been omitted, exhibits a ΔE value as determined from ΔL*, Δa*, and Δb* CEILAB color values, to be >2 when viewed from the face side of the scoured fabric, compared to the prepared for print (PFP) light-blocking element comprising the dried and non-foamed color-masking layer, and
    the cured, crushed, and dried foamed opacifying layer comprises:
    (a) porous particles that are present in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;
    (b') a binder matrix that is present in an amount of at least 10 weight % and up to and including 80 weight %;
    (c) two or more additives that are present in a total amount of at least 0.0001 weight % and up to and including 40 weight %, the two or more additives comprising at least one foaming surfactant and at least one compound that is a foam stabilizer;
    (d) less than 5 weight % of an aqueous medium; and
    (e) an opacifying colorant that is present in an amount of at least 0.0001 weight % and up to and including 3 weight %, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm,
    all amounts of the (a) porous particles, (b') binder material, (c) two or more additives, (d) aqueous medium, and (e) opacifying colorant being based on the total weight of the cured, crushed, and dried foamed opacifying layer.

2. The prepared for print (PFP) light-blocking element of claim 1, further comprising:
    a non-foamed functional composition at a coverage of at least 0.5 g/cm² and up to and including 10 g/cm² disposed on the cured, crushed, and dried foamed opacifying layer,
    the non-foamed functional composition comprising glass particles or organic polymeric particles having a mode particle size of at least 5 μm and up to and including 100 μm, in an amount of at least 5 weight % and up to and including 99 weight %, and one or more water-soluble or water-dispersible organic polymeric binders, based on the total weight of the non-foamed functional composition.

3. The prepared for print (PFP) light-blocking element of claim 1 that has one or more images or designs printed on an outer surface thereof.

4. The prepared for print (PFP) light-blocking element of claim 3 that has one or more thermally-printed images or designs on an outer surface thereof.

5. The prepared for print (PFP) light-blocking element of claim 1, comprising one or more printed images or designs on the face side of the scoured fabric.

6. The prepared for print (PFP) light-blocking element of claim 1, wherein the one or more tinting components are chosen from titanium dioxide, titanium coated mica, barium sulfate, calcium carbonate, zinc oxide, azo pigments, azo pigment lakes, Naphthol pigments, and combinations of these materials.

7. The prepared for print (PFP) light-blocking element of claim 1, wherein the film-forming polymeric binder in the dried and non-foamed color-masking composition comprises a crosslinkable binder material.

8. The prepared for print (PFP) light-blocking element of claim 1, wherein the weight ratio of the total of the one or more tinting components to the film-forming polymeric binder in the dried and non-foamed color-masking composition is at least 5:1 and up to and including 20:1.

9. The prepared for print (PFP) light-blocking element of claim 1, wherein the dried and non-foamed color-masking composition effectively reduces visual perception on the uncoated face side of the treated fabric when a cured, crushed, and dried foamed opacifying layer has been disposed on the coated back side, the reduced visual perception being measured by a ΔE value as determined from ΔL*, Δa*, and Δb* CEILAB color values, to be <1.0, compared to visual perception on the uncoated face side of the same treated fabric when the cured, crushed, and dried foamed opacifying layer has been omitted.

10. The prepared for print (PFP) light-blocking element of claim 1 that is provided in roll form so that the cured, crushed, and dried foamed opacifying layer is in intimate contact with the face side of the scoured fabric of adjacent prepared for print (PFP) light-blocking element.

11. The prepared for print (PFP) light-blocking element of claim 2 that is provided in roll form so that the non-foamed functional composition is in intimate contact with the face side of the scoured fabric of adjacent prepared for print (PFP) light-blocking element.

12. The prepared for print (PFP) light-blocking element of claim 2, wherein the glass particles are hollow glass particles.

13. The prepared for print (PFP) light-blocking element of claim 2, wherein the non-foamed functional composition further comprises one or more of a lubricant, tinting agent, coating aid, crosslinking agent, and a thickener.

14. The prepared for print (PFP) light-blocking element of claim 1, wherein the (e) opacifying colorant comprises a carbon black that is present at least within the pores of the (a) porous particles.

\* \* \* \* \*

UNITED STATES PATENT AND TRADEMARK OFFICE
CERTIFICATE OF CORRECTION

| | | |
|---|---|---|
| PATENT NO. | : 12,004,676 B1 | Page 1 of 1 |
| APPLICATION NO. | : 18/359197 | |
| DATED | : June 11, 2024 | |
| INVENTOR(S) | : Mridula Nair | |

It is certified that error appears in the above-identified patent and that said Letters Patent is hereby corrected as shown below:

In the Specification

In Column 1, Line 8, delete "Jul. 7," and insert -- July 26, --.

Signed and Sealed this
Twenty-second Day of October, 2024

*Katherine Kelly Vidal*

Katherine Kelly Vidal
*Director of the United States Patent and Trademark Office*